United States Patent
Lee

(10) Patent No.: US 11,962,232 B2
(45) Date of Patent: Apr. 16, 2024

(54) DC-DC CONVERTER FOR SOLAR POWER-LINKED ENERGY STORAGE SYSTEM, AND CONTROL METHOD THEREFOR

(71) Applicant: LG INNOTEK CO., LTD., Seoul (KR)

(72) Inventor: Jae Geun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 485 days.

(21) Appl. No.: 17/271,845

(22) PCT Filed: Aug. 29, 2019

(86) PCT No.: PCT/KR2019/011041
§ 371 (c)(1),
(2) Date: Feb. 26, 2021

(87) PCT Pub. No.: WO2020/046004
PCT Pub. Date: Mar. 5, 2020

(65) Prior Publication Data
US 2021/0320518 A1  Oct. 14, 2021

(30) Foreign Application Priority Data
Aug. 30, 2018 (KR) .................. 10-2018-0102871

(51) Int. Cl.
*H02M 1/00* (2006.01)
*H02J 3/38* (2006.01)
(Continued)

(52) U.S. Cl.
CPC .......... *H02M 1/0032* (2021.05); *H02J 3/381* (2013.01); *H02J 7/0031* (2013.01);
(Continued)

(58) Field of Classification Search
CPC ..... H02M 1/0032; H02M 3/156; H02S 40/38; H02J 3/381; H02J 7/007182; H02J 7/31; H02J 7/35; H02J 2207/20; H02J 2300/24
(Continued)

(56) References Cited

U.S. PATENT DOCUMENTS

2012/0120694 A1* 5/2012 Tsuchiya .......... H01L 31/02021
363/131
2013/0082645 A1  4/2013 Fukada
(Continued)

FOREIGN PATENT DOCUMENTS

EP   2 306 613 A1   4/2011
JP   5376056 B2   12/2013
(Continued)

*Primary Examiner* — Yemane Mehari
(74) *Attorney, Agent, or Firm* — Birch, Stewart, Kolasch & Birch, LLP

(57) ABSTRACT

According to one embodiment, disclosed are a DC-DC converter for preventing the unnecessary consumption of a battery in a solar power-linked energy storage system, and a control method thereof. Particularly, a sensing switch is controlled according to a current mode, and thus unnecessary power consumption can be prevented. In addition, a method for operating a circuit breaker, related thereto, is disclosed.

16 Claims, 9 Drawing Sheets

(51) Int. Cl.
 *H02J 7/00* (2006.01)
 *H02J 7/35* (2006.01)
 *H02M 3/156* (2006.01)
 *H02S 40/38* (2014.01)

(52) U.S. Cl.
 CPC .......... *H02J 7/007182* (2020.01); *H02J 7/35* (2013.01); *H02M 3/156* (2013.01); *H02S 40/38* (2014.12); *H02J 2207/20* (2020.01); *H02J 2300/24* (2020.01)

(58) Field of Classification Search
 USPC .......................................................... 363/13
 See application file for complete search history.

(56) References Cited

U.S. PATENT DOCUMENTS

| | | | | |
|---|---|---|---|---|
| 2013/0099748 | A1* | 4/2013 | Shimizu | H02J 7/0014 |
| | | | | 324/426 |
| 2014/0210275 | A1* | 7/2014 | Gong | H02J 7/35 |
| | | | | 307/82 |
| 2016/0204649 | A1 | 7/2016 | Kim et al. | |
| 2018/0011149 | A1* | 1/2018 | Tsai | G01R 15/146 |

FOREIGN PATENT DOCUMENTS

| | | |
|---|---|---|
| KR | 10-0665167 B1 | 1/2007 |
| KR | 10-1008202 B1 | 1/2011 |
| KR | 10-2013-0049880 A | 5/2013 |
| KR | 10-1510960 B1 | 4/2015 |
| KR | 10-1516193 B1 | 5/2015 |

\* cited by examiner

DC-DC CONVERTER FOR SOLAR POWER-LINKED ENERGY STORAGE SYSTEM, AND CONTROL METHOD THEREFOR

CROSS REFERENCE TO RELATED APPLICATIONS

This application is the National Phase of PCT International Application No. PCT/KR2019/011041, filed on Aug. 29, 2019, which claims priority under 35 U.S.C. 119(a) to Patent Application No. 10-2018-0102871, filed in the Republic of Korea on Aug. 30, 2018, all of which are hereby expressly incorporated by reference into the present application.

TECHNICAL FIELD

In the present disclosure, a DC-DC converter preventing unnecessary consumption of a battery in a solar power-linked energy storage system and a control method thereof are disclosed.

BACKGROUND ART

Recently, as awareness of environmental protection has been increased, interest in a method of generating electricity without discharging pollutants such as carbon dioxide has been emerged. In particular, in the case of a power generation system using solar light, the development and installation cost of the technology becomes cheaper powered by the technological advancement, and the supply is gradually expanding.

In such a solar power generation system, a plurality of solar cells is assembled to form a plurality of photovoltaic modules. The DC power generated from the plurality of photovoltaic modules is converted to AC power through an inverter, and thus, it can be immediately used in industrial facilities.

Meanwhile, in the case of solar power supply generation, a gap in power generation, during which sufficient power generation is not achieved due to night time when solar light is unavailable or changes in weather, occurs inevitably. Therefore, in order to compensate for such disadvantages, a solar power generation system is essentially equipped with a battery to enable stable power supply.

However, in the case of a battery, there is a problem that unnecessary power consumption may occur as the sensing of the battery is continuously performed.

DETAILED DESCRIPTION OF THE INVENTION

Technical Subject

The present disclosure may disclose a DC-DC converter that prevents unnecessary consumption of a battery in a solar power-linked energy storage system, and a control method thereof. Specifically, a DC-DC converter determining whether to sense a battery according to a current mode in which the DC-DC converter is operating, and a control method thereof are disclosed. Of course, the technical problem to be solved is not limited to the technical problems as described above, and various technical problems may be further included within a scope that is obvious to a person skilled in the art.

Technical Solution

The DC-DC converter according to the first aspect comprises: a converting circuit converting power received from the solar power supply; a sensing circuit including one or more resistors and a sensing switch, and sensing a state of a battery; and a processor controlling the sensing switch based on the state of the battery, wherein the processor may determine one of a plurality of modes as a current mode based on the state of the battery, and may turn off the sensing switch when the current mode is a sleep mode.

In addition, the sensing circuit may sense the remaining amount of a battery connected in parallel to the sensing circuit.

In addition, the processor may determine the current mode as the sleep mode when the remaining amount of the battery is less than or equal to a first value.

In addition, it may further include: an input unit receiving power; an output unit converting power of the input unit and supplying it to the battery; and a circuit breaker electrically separating the output unit from the battery when the current mode is a shutdown mode.

In addition, the processor may determine the current mode as a shutdown mode when the remaining amount of the battery is less than or equal to a second value, wherein the second value may be smaller than the first value.

In addition, the plurality of modes may include at least one of an operating mode, a standby mode, a fault mode, a shutdown mode, and a sleep mode.

In addition, the processor may turn on the sensing switch when the current mode is the operating mode, the standby mode, and the fault mode.

In addition, the processor may determine the current mode as the fault mode when an abnormality is sensed in the battery.

In addition, the sleep mode may reduce power consumption by deactivating functions other than functions required for communication with an inverter among a plurality of functions.

In addition, while the processor is operating in the sleep mode or the shutdown mode, when the current state is a state in which the battery can be charged through communication with the inverter, a power may be supplied to the battery by switching the current mode to an operating mode.

In addition, the processor may determine the current state as a state in which the battery can be charged when a predetermined amount of power or more is supplied from the solar power supply.

In addition, the processor may convert a voltage of power received from the solar power supply by controlling a plurality of switches included in the converting circuit.

In addition, a control method of the DC-DC converter according to the second aspect may comprise the steps of: sensing the remaining amount of the battery using a sensing circuit; determining one of a plurality of modes as a current mode based on the remaining amount of the battery; turning off a sensing switch included in the circuit when the current mode is a sleep mode; and maintaining the sensing switch in an on state when the current mode is not a sleep mode.

In addition, the third aspect can provide a computer-readable recording medium in which a program for executing the method of the second aspect on a computer is recorded.

Advantageous Effects

The present disclosure may disclose a DC-DC converter preventing unnecessary consumption of a battery in a solar power-linked energy storage system, and a control method thereof.

BEST MODE

Hereinafter, embodiments of the present invention will be described in detail with reference to the accompanying drawings. However, the technical idea of the present invention is not limited to some embodiments to be described, but may be implemented in various forms, and if it is within the scope of the technical idea of the present invention, one or more of the components may be selected, combined, and substituted between the embodiments for use. In addition, terms (including technical and scientific terms) used in the embodiments of the present invention are generally understood by those of ordinary skill in the technical field to which the present invention belongs unless explicitly defined and described, and it can be interpreted as a meaning, and terms generally used, such as terms defined in a dictionary, may be interpreted in consideration of the meaning in the context of the related technology. In addition, terms used in the embodiments of the present invention are for describing the embodiments and are not intended to limit the present invention. In the present specification, the singular form may include the plural form unless specifically stated in the phrase, and when described as "at least one (or more than one) of A and B and C", it may contain one or more of all combinations that can be combined with A, B, and C. In addition, terms such as first, second, A, B, (a), (b), and the like may be used in describing the components of the embodiment of the present invention. These terms are only for distinguishing the component from other components, and are not limited to the nature, order, or order of the component by the term. And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components. In addition, when it is described as being formed or disposed in the "top (upper side) or bottom (lower side)" of each component, the top (upper side) or bottom (lower side) not only includes a case when the two components are in direct contact with each other but also includes a case where one or more other components are formed or disposed between the two components. In addition, when expressed as "top (upper side) or bottom (lower side)", the meaning of not only an upward direction but also a downward direction based on one component may be included.

Hereinafter, embodiments of the present invention will be described in detail with reference to the drawings.

Figure 1:
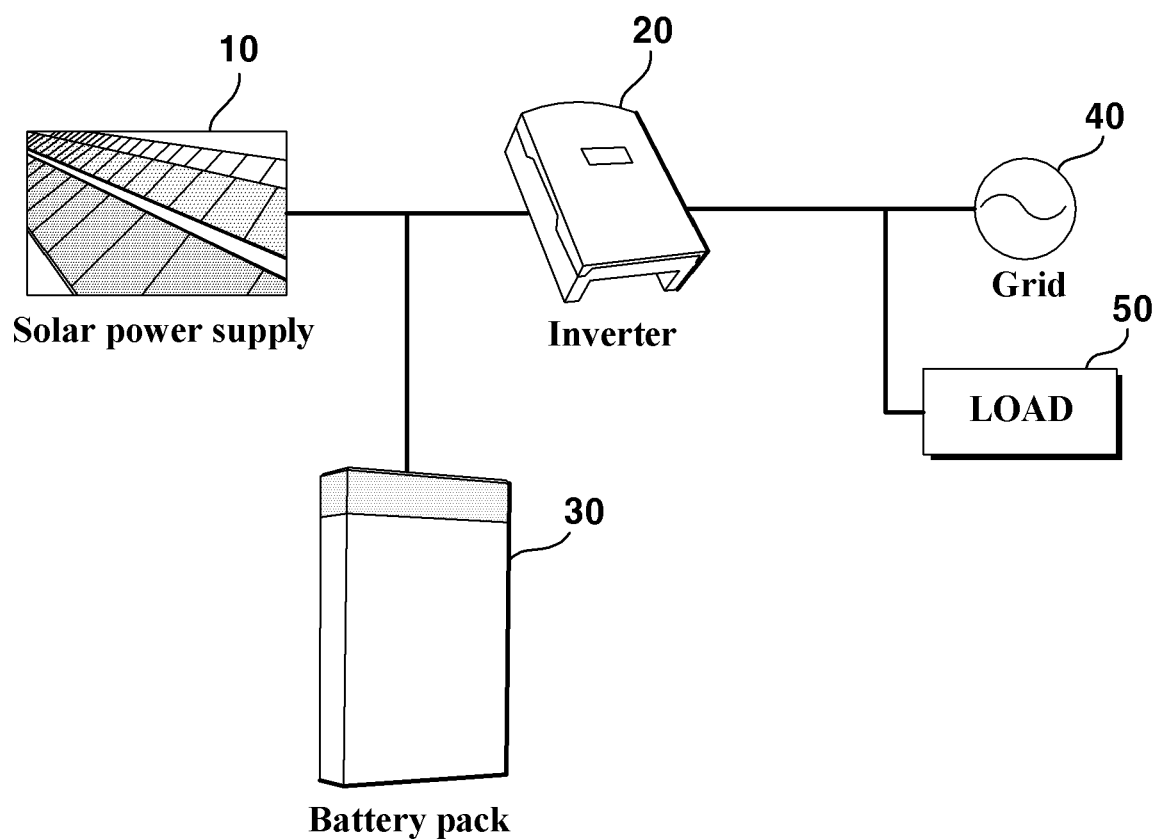
FIG. 1 is a diagram illustrating a solar power generation system according to an embodiment. The solar power-linked energy storage system may be an example of a solar power generation system.

FIG. 1 is a diagram illustrating a solar power generation system according to an embodiment. A solar power-linked energy storage system may be an example of the solar power generation system.

As illustrated in FIG. 1, a solar power generation system may comprise a solar power supply 10, an inverter 20, a battery pack 30, and a load 50.

However, it can be understood by a person skilled in the art that general-purpose components other than the components illustrated in FIG. 1 may be further included in the solar power generation system. For example, the solar power generation system may further include a grid 40. Or, according to another embodiment, it may be understood by a person skilled in the art that some of the components illustrated in FIG. 1 may be omitted.

The solar power supply 10 according to an embodiment may be composed of a plurality of photovoltaic modules in which photovoltaic cells are assembled, and a photovoltaic cell formed by bonding a p-type semiconductor and an n-type semiconductor generates electricity with light. Specifically, when a light is irradiated on a photovoltaic cell, electrons and holes are generated therein. The generated charges are moved to the P and N poles, respectively, and by this action, a potential difference occurs between the P and N poles, and at this time, when a load is connected to the photovoltaic cell a current flows. Here, the photovoltaic cell refers to the smallest unit that generates electricity, and the photovoltaic cells are gathered to form a photovoltaic module, and the photovoltaic module may form an array connected in series/parallel to form a solar power supply 10.

In order to supply a power to the power grid 40 or the load 50, the inverter 20 according to an embodiment may convert a direct current (DC) power generated by the solar power supply 10 by the photoelectric effect to an alternating current (AC) power. Here, the power grid 40 may refer to a grid for transmitting and distributing power produced by the solar power generation system. Meanwhile, the amount of power generated by the solar power supply 10 is continuously changed by temporal factors such as sunrise and sunset, or external factors such as weather and the like. Therefore, the inverter 20 controls the voltage generated from the solar power supply 10 to find the maximum power and supply it to the power grid 40. At this time, when a case occurs in that the power for operating the inverter is lower than the output power of the inverter, the inverter 20 may consume the power of the power grid 40 in reverse. Of course, in this case, the inverter may prevent power from being reversed by blocking the power flowing into the power grid 40. Accordingly, various optimal control methods for extracting maximum power from the solar power supply 10 are applied to the solar power generation system, so that the above-described operation of the inverter 20 can be performed more efficiently.

As a representative maximum power point (MPP) method of the solar power supply 10, there are a perturbation and observation (PO) method, an incremental conductance (IC) control method, a constant voltage (CV) control method, and the like. Here, the PO method is a method of periodically measuring the voltage and current of the solar power supply 10 to calculate power and then tracking the MPP using the power value. The IC control method is a method of measuring the voltage and current generated from the solar power supply 10, so that the rate of change of the power with respect to the change of the operating point of the terminal voltage of the array becomes '0'. The CV control method is a method of controlling the solar power supply 10 with a constant reference voltage (ref V) regardless of the operating voltage or power of the array. According to each optimal control method, a power source input from the solar power supply 10 to the inverter may operate as a voltage source or a current source.

The load 50 according to an embodiment may refer to a product using an electricity type used in real life. For example, the inverter 20 may obtain AC power of a desired voltage and frequency through an appropriate conversion method, a switching element, or a control circuit, and supply electricity to home appliances in general homes or machinery products in industrial facilities.

In addition, in the case of solar power generation, a gap in power generation, during which sufficient power generation is not achieved due to night time when solar light is unavailable or changes in weather, occurs inevitably. Therefore, in order to compensate for such disadvantages, the solar power generation system is essentially equipped with a battery to enable stable power supply.

A battery pack 30 according to an embodiment may include at least one of a converter, a battery pack, a battery management system (BMS), and a battery control circuit.

The battery may be composed of a lithium ion battery or a nickel hydrogen battery, but is not necessarily limited to this configuration, and may refer to a battery that can be used semi-permanently through charging.

DC-DC converter is a device that can convert DC power produced through the solar power supply 10 into DC power suitable for a battery. In general, a power is converted in a way that a DC power is converted into an AC power and then the AC power is reverse converted to a DC power.

The battery management system (BMS) may provide a function of misuse protection of cells constituting the battery, balancing between unit cells, measuring the remaining amount of the charge (SOC), temperature maintenance management, or system monitoring function. Therefore, based on a sensor measuring the state of the cell and a function of receiving the measured value of the sensor and transmitting it to the control system of the applied product, it is possible to build and control circuits that generate an abnormal signal when the temperature and charging state and the like of the system exceed the predetermined value, and cut-off and open the power circuit between cells.

Meanwhile, the inverter 20 and the battery pack 30 may further include a display device (not shown). For example, the user can check the supply and demand status of the power of the solar panel, reverse wiring, sleep mode operation, or the state of charge of the battery through the display device. Meanwhile, the display device may be a liquid crystal display, a thin film transistor-liquid crystal display, an organic light-emitting diode, a flexible display, a three dimensional (3D) display, an electrophoretic display, or the like. In addition, the display device may include two or more displays depending on the implementation type. In addition, when the touch pad of the display has a layer structure and is configured as a touch screen, the display may also be used as an input device in addition to an output device.

In addition, the inverter 20 and the battery pack 30 may communicate with each other through wired communication or wireless communication. For example, the inverter 20 and the battery pack 30 may include a Wi-Fi chip, a Bluetooth chip, a wireless communication chip, an NFC chip, or the like. Of course, the inverter 20 and the battery pack 30 may communicate with each other using various external devices using a Wi-Fi chip, a Bluetooth chip, a wireless communication chip, an NFC chip, and the like. The Wi-Fi chip and the Bluetooth chip can perform communication using a Wi-Fi method and a Bluetooth method, respectively. In the case of using a Wi-Fi chip or a Bluetooth chip, various types of connection information such as SSID, session key, and the like are first transmitted and received, and by using this, communication is connected and then various types of information may be transmitted and received. The wireless communication chip may perform communication according to various communication standards such as IEEE, ZigBee, 3rd Generation (3G), 3rd Generation Partnership Project (3GPP), Long Term Evolution (LTE), and the like. The NFC chip can operate in a Near Field Communication (NFC) method using a 13.56 MHz band among various RF-ID frequency bands such as 135 kHz, 13.56 MHz, 433 MHz, 860 to 960 MHz, 2.45 GHz, and the like.

Figure 2:
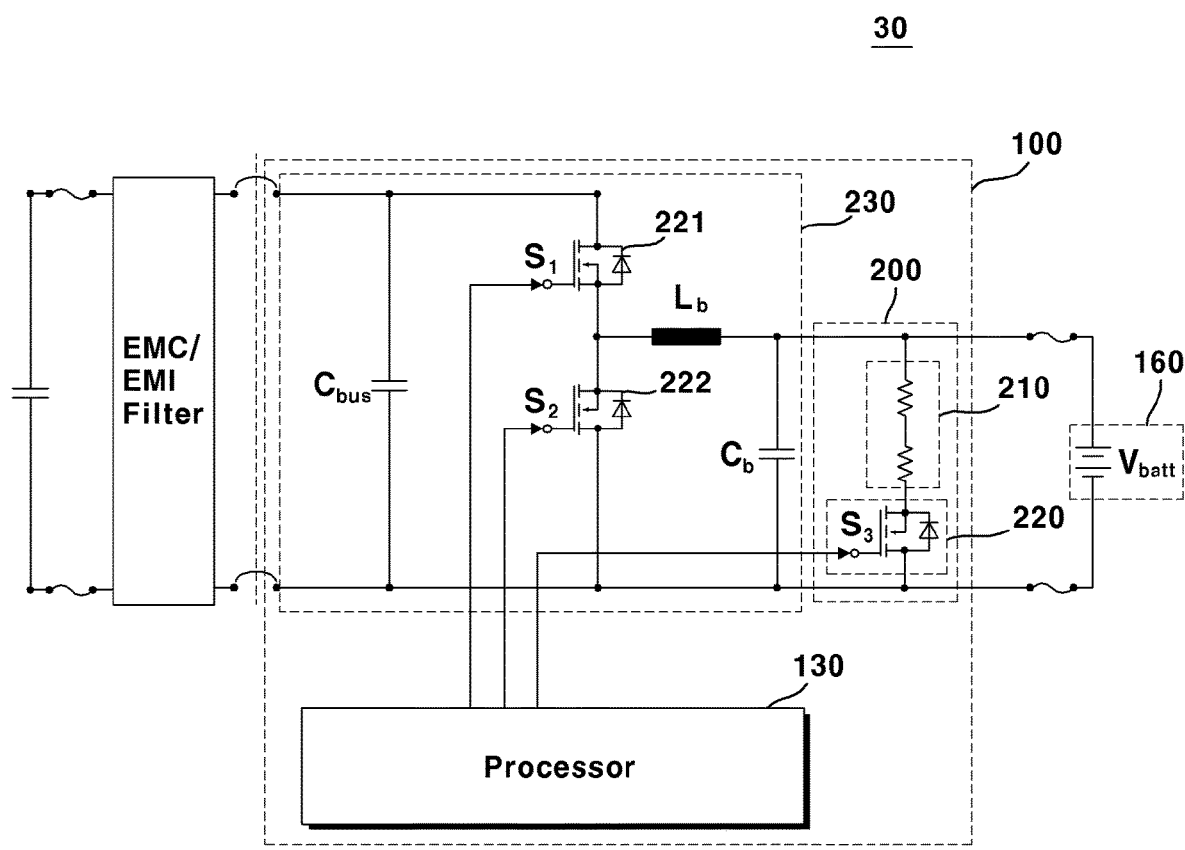
FIG. 2 is a block diagram illustrating an example in which a DC-DC converter is connected to a battery and operates according to an embodiment.

FIG. 2 is a block diagram illustrating an example in which a DC-DC converter 100 is connected to a battery 160 and operates according to an embodiment.

As illustrated in FIG. 2, the battery pack 30 may include a DC-DC converter 100 and a battery 160. In addition, referring to FIG. 2, the DC-DC converter 100 may include a sensing circuit 200, a converting circuit 230, and a processor 130. In addition, the sensing circuit 200 may include one or more resistors 210 and a sensing switch 220.

However, it can be understood by a person skilled in the art that general-purpose components other than the components illustrated in FIG. 2 may be further included in the battery pack 30 or the DC-DC converter 100. For example, the battery pack 30 or the DC-DC converter 100 may further include a memory (not shown). Or, according to another embodiment, it may be understood by a person skilled in the art that some of the components illustrated in FIG. 2 may be omitted.

The converting circuit 230 according to an embodiment may convert power received from the solar power supply 10. For example, the converting circuit 230 may convert a voltage of power applied from the solar power supply 10. Specifically, the converting circuit 230 may convert a voltage using a plurality of switches 221 and 222 included in the converting circuit 230. The plurality of switches 221 and 222 may operate according to a control signal received from the processor 130.

The converting circuit 230 may include a capacitor, an inductor, a resistor, a switch, and the like, and may be configured as a half bridge or a full bridge.

The sensing circuit 200 according to an embodiment may include one or more resistors 210 and a sensing switch 220, and may sense the state of the battery 160. Specifically, the sensing circuit 200 may sense the remaining amount of the battery 160 connected in parallel to the sensing circuit 200. Since the battery 160 is connected in parallel with the sensing circuit 200, the remaining amount of the battery 160 may be determined based on a current flowing through the one or more resistors 210 or a voltage applied to the one or more resistors 210. In addition, in the process of determining the remaining amount of the battery 160, the sensing circuit 200 may consume power of the battery 160.

The sensing circuit 200 may include a sensing switch 220. The sensing switch 220 is turned on or off according to a situation enabling the sensing circuit 200 to be turned on or off Specifically, the sensing switch 220 may be turned on or off according to a current mode in which the DC-DC converter 100 is currently operating. For example, when the current mode is a sleep mode, the sensing switch 220 may be turned off so that the sensing circuit 200 may not consume power. As another example, when the current mode is an operating mode, the sensing switch 220 is turned on so that the sensing circuit 200 may sense the remaining amount of the battery 160. The sleep mode according to an embodiment may be a mode for reducing power consumption of the DC-DC converter 100 by deactivating functions other than a function required for communication with the inverter 20 among a plurality of functions.

The processor 130 according to an embodiment may control the sensing switch 220 based on the state of the battery 160.

The processor 130 may determine one of the plurality of modes as the current mode based on the state of the battery 160 and may turn off the sensing switch 220 when the current mode is a sleep mode.

When the remaining amount of the battery 160 is less than or equal to a first value, the processor 130 may determine the current mode as the sleep mode. The sleep mode according to an embodiment may be a mode for reducing power consumption of the DC-DC converter 100 by deactivating functions other than a function required for communication with the inverter 20 among a plurality of functions. Therefore, when the remaining amount of the battery 160 is less than or equal to a first value, the functions other than the functions required for communication with the inverter 20 among a plurality of functions are deactivated according to the control of the processor 130, thereby possibly reducing the power of the DC-DC converter 100.

The processor 130 may control not only the sensing circuit 200 but also the converting circuit 230. For example, the processor 130 may convert a voltage of power received from the solar power supply 10 by controlling a plurality of switches 221 and 222 included in the converting circuit 230.

Figure 3:
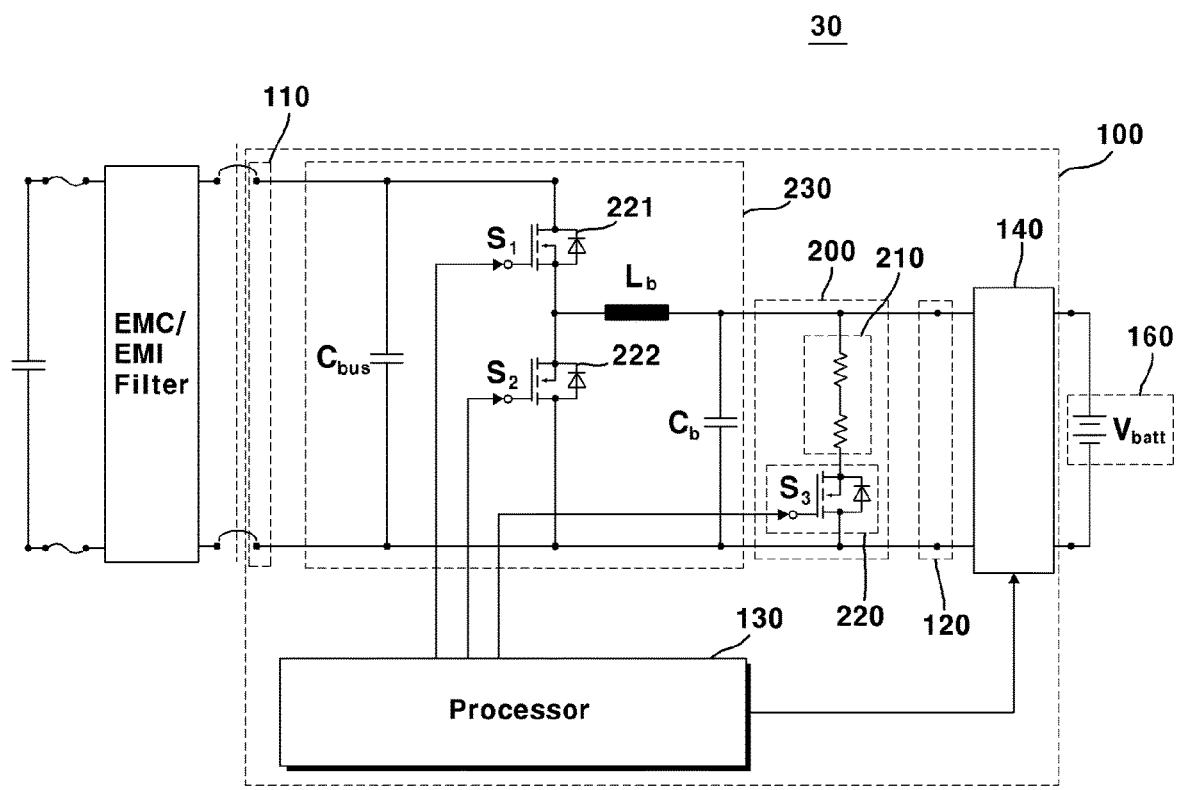
FIG. 3 is a block diagram illustrating an embodiment in which a DC-DC converter including a circuit breaker according to an embodiment.

FIG. 3 is a block diagram illustrating an embodiment in which a DC-DC converter 100 including a circuit breaker according to an embodiment.

As illustrated in FIG. 3, a DC-DC converter 100 may comprise: a sensing circuit 200; a converting circuit 230; a processor 130; an input unit 110; an output unit 120; and a circuit breaker 140. In addition, the sensing circuit 200 may include one or more resistors 210 and a sensing switch 220.

However, it can be understood by a person skilled in the art that general-purpose components other than the components illustrated in FIG. 3 may be further included in the DC-DC converter 100. For example, the DC-DC converter 100 may further include a memory (not shown). Or, according to another embodiment, it may be understood by a person skilled in the art that some of the components illustrated in FIG. 3 may be omitted.

The input unit 110 according to an embodiment may receive a power. For example, the input unit 110 may receive a power from the solar power supply 10.

The output unit 120 according to an embodiment may convert power received from the input unit 110 and supply the converted power to the battery 160.

The circuit breaker 140 according to an embodiment may physically or electrically separate the battery 160 from the DC-DC converter 100 according to the control of the processor 130 to cut-off the over discharging of the battery 160. Specifically, the circuit breaker 140 may electrically separate the output unit 120 and the battery 160 when the current mode is a shutdown mode.

For example, when the remaining amount of the battery 160 measured in a sleep mode is less than a predetermined value the processor 130 may physically separate the battery 160 to prevent over discharging of the battery 160. For example, even if the battery 160 is switched to a sleep mode, power may continue to be consumed for some essential functions (such as a function to communication with the inverter). Therefore, when the processor 130 determines that the remaining amount of the charge received from the BMS is less than 0% can prevent the battery 160 from over discharging due to continued battery consumption by operating the circuit breaker 140. The current mode when the circuit breaker 140 is operating may be a shutdown mode.

Here, according to an embodiment, a residual amount value of 0%, which is a criterion of determination, may mean a remaining amount of a battery displayed to a user, and an actual battery may mean a state in which a 3% remaining amount is present. That is, from the design stage, it can be designed in a way that when the minimum remaining battery capacity value for preventing the battery from over discharging is reached, the remaining charge is displayed as 0% to a user.

The circuit breaker 140 is implemented in the form of a circuit breaker (CB) to physically or electrically cut off the battery. For example, it may be implemented in the form of a switch, and may be implemented as a two-stage switch to prevent damage to a circuit due to a rapid current change, or may be implemented as a FET to cut off only the power discharged from the battery 160.

When a second value is less than a first value, the processor 130 determines the current mode as a sleep mode when the remaining amount of the battery is smaller than the first value and larger than the second value, and may determine the current mode as a shutdown mode when the remaining amount of the battery is smaller than the second value.

The DC-DC converter 100 may operate in one of a plurality of modes. The plurality of modes according to an embodiment may include at least one of an operating mode, a standby mode, a fault mode, a shutdown mode, and a sleep mode.

When the current mode is an operating mode, a standby mode, or a fault mode, the processor 130 may turn on the sensing switch 220. When an abnormality is sensed by the battery 160, the processor 130 may determine the current mode as the fault mode.

When the current mode is a sleep mode or a shutdown mode, the processor 130 may turn off the sensing switch 220. In particular, when the current mode is a shutdown mode, the processor 130 may electrically or physically separate the battery 160 from the DC-DC converter 100 by operating the circuit breaker 140 regardless of the operation of the sensing switch 220.

When the current state is a state in which the battery 160 can be charged through communication with the inverter 20 while the DC-DC converter 100 is operating in a sleep mode or a shutdown mode, a power may be supplied to the battery 160 by switching the current mode to an operation mode. Here, the processor 130 may determine a current state as a state in which the battery can be charged when a predetermined amount of power or more is supplied from the solar power supply 10.

Figure 4:
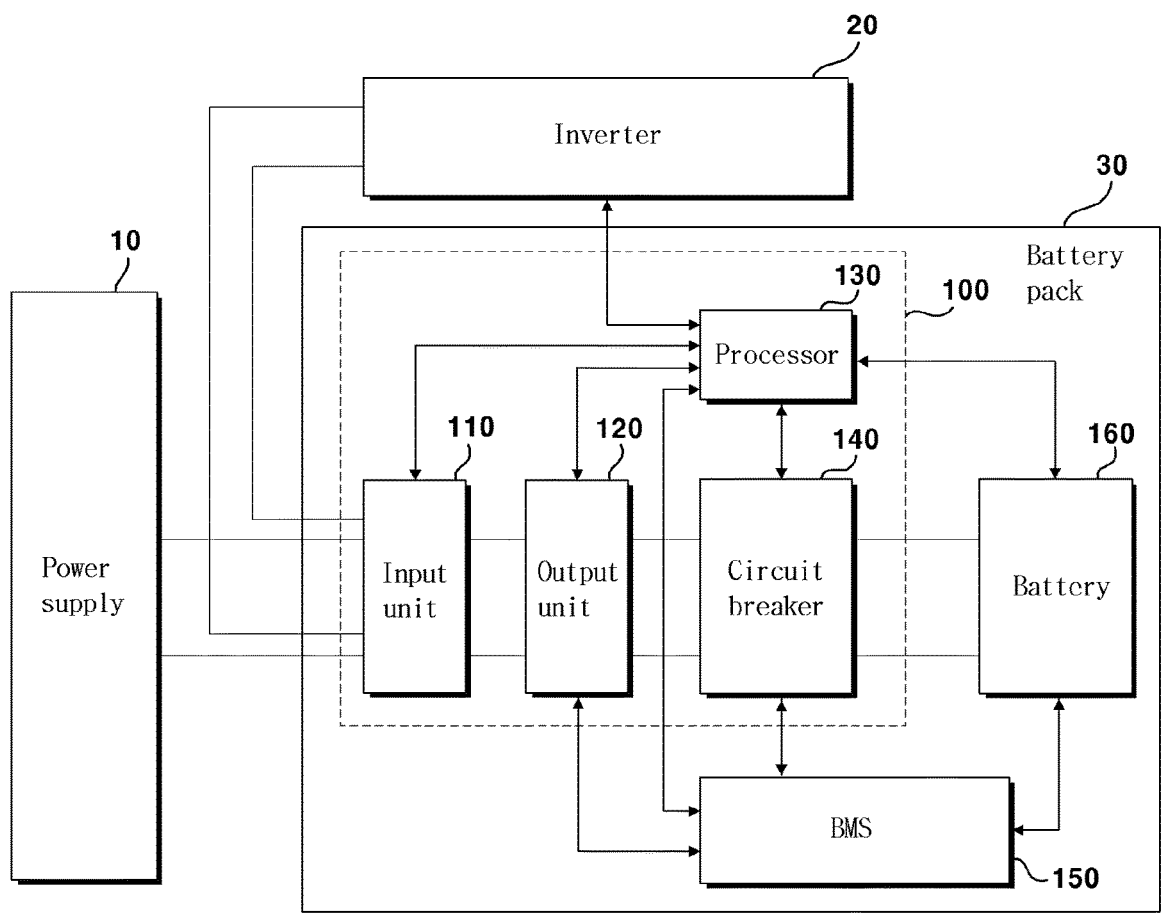
FIG. 4 is a block diagram illustrating in detail a solar power-linked energy storage system according to an embodiment.

FIG. 4 is a block diagram illustrating in detail a solar power-linked energy storage system according to an embodiment.

Referring to FIG. 4, a solar power-linked energy storage system according to an embodiment may include a solar power supply 10, an inverter 20, and a battery pack 30. In addition, the battery pack 30 may include a DC-DC converter 100, a BMS 150, and a battery 160, and the DC-DC converter 100 may include an input unit 110, an output unit 120, a processor 130, and a circuit breaker 140. However, this is one embodiment, and the DC-DC converter 100 may include the BMS 150 as a component thereof.

Specifically, the input unit 110 receives power from the solar power supply 10.

The output unit 120 converts power from the input unit 110 and supplies it to the battery 160. For example, DC power input to the input unit 110 may be temporarily converted to AC, then converted back to DC power of a desired voltage, and outputted to the battery 160. Of course, when the power of the battery 160 is supplied to the inverter 20, the input unit 110 and the output unit 120 may perform opposite functions.

The processor 130 may determine an operating mode according to the state of the battery 160. For example, the battery pack 30 supplies power to the inverter 20 by using all functions of the battery pack during normal operation, or is operated in an operating mode that is charged with power input from the solar power supply 10. However, when there is no charge from the solar power supply 10 such as winter, night, bad weather, and the like in Europe, the remaining battery level (SOC) falls below the first value, in order to prevent continuous consumption of the battery, the processor 130 may control the battery 160 to be switched to a sleep mode.

For example, the processor 130 measures a first residual amount value of the battery 160 in an operating mode, and may switch the current mode to a sleep mode when the first residual amount value is less than or equal to a first value. Here, the first remaining amount value means a value measured in the operating mode, and the first value may mean that the remaining charge amount of the battery obtained through BMS is less than a predetermined value (e.g., 5%). In addition, the sleep mode may be a mode in which power consumption is reduced by deactivating functions other than functions required for communication with the inverter among a plurality of functions activated in the operating mode.

The processor 130 measures a second value of the battery at a preset period in a sleep mode, and may switch the operating mode to the shutdown mode when the second remaining amount value is less than or equal to a second value. Here, the second value is smaller than the first value.

For example, the second value may mean that the remaining charge of the battery obtained through BMS is 0% or less. Here, the second value may be the one considering that 0% is displayed to a user when an actual remaining amount of about 3% remains so as to prevent complete discharging of the battery at the time of design.

In addition, in a shutdown mode, the processor 130 may switch to a sleep mode when the second remaining amount value of the battery 160 is greater than a second value and less than a first value. For example, the DC-DC converter 100 may determine whether to continuously maintain the sleep mode based on the remaining amount of the battery charge obtained through the BMS in a shutdown mode.

In addition, in an operating mode, the processor 130 may switch to a shutdown mode when the first remaining amount of the battery is less than a second value. For example, the DC-DC converter 100 may skip the sleep mode in a first mode and immediately switch to a shutdown mode.

In addition, in a shutdown mode, the processor 130 may switch to an operating mode when the second remaining amount of the battery is greater than a first value. For example, when it is determined that the battery 160 can be charged, the processor 130 may switch to a first operation mode and supply power to the battery 160.

In addition, while the DC-DC converter 100 is operating in a sleep mode or a shutdown mode, when it is determined that the solar power-linked energy storage system is capable of charging the battery through communication with the inverter, the processor 130 may switch to an operating mode and supply power to the battery.

For example, since the DC-DC converter 100 maintains communication with the inverter 20 even in a sleep mode, when the processor 130 is supplied with more than a predetermined amount of power from the solar power supply 10, the current state can be determined as a state in which the battery can be charged.

In addition, while the processor 130 is operating in a shutdown mode, when the current state is a state in which the battery can be charged, the state of the circuit breaker 140 may be switched to the connected state to supply power to the battery 160.

Meanwhile, in the above-described example, the first value and the second value exemplify values that can be suggested by the designer to proceed to a sleep mode and a shutdown mode within a range where the second value is smaller than the first value, but the scope of rights is not limited to the above values.

In the processor 130 according to an embodiment, the processor may be implemented as an array of a plurality of logic gates, or a combination of a general-purpose microprocessor and a memory in which a program executable in the microprocessor is stored. In addition, it can be understood by a person skilled in the art to which the present embodiment belongs to that it may be implemented with other types of hardware. In addition, it is one embodiment that the processor 130 is included in the DC-DC converter 100, but it may be installed outside the DC-DC converter 100.

Figure 5:
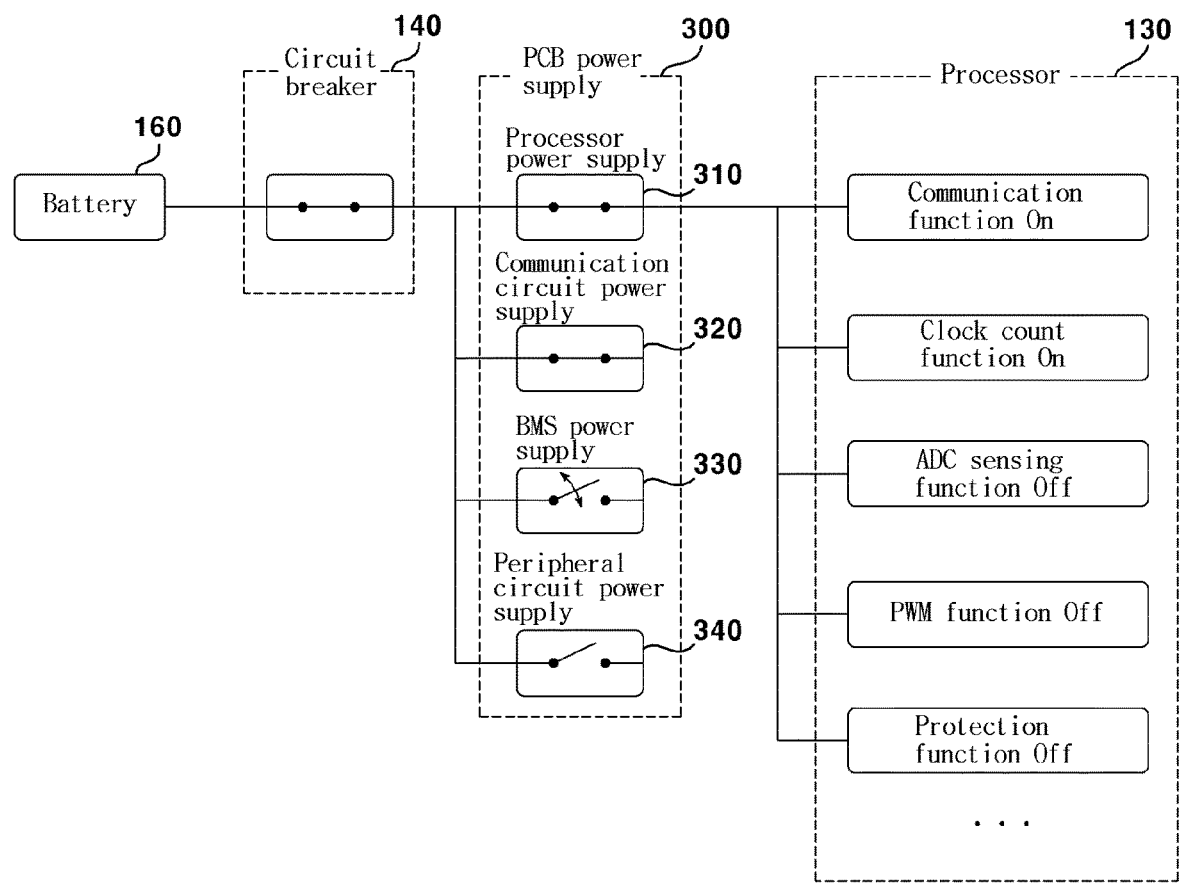
FIG. 5 is a diagram for describing a sleep mode according to an embodiment.

FIG. 5 is a diagram for describing a sleep mode according to an embodiment.

A DC-DC converter 100 according to an embodiment may include a PCB power supply 300. Here, the printed circuit board (PCB) may mean a substrate in which a conductor circuit is formed on one insulating substrate based on the design of circuit components. Accordingly, each component of the DC-DC converter 100 according to an embodiment may configure the PCB power supply 300 so that a circuit is designed based on a PCB and power is inputted for each circuit. For example, the PCB power supply 300 may include a processor power supply 310, a communication circuit power supply 320, a BMS power supply 330, and other peripheral circuit power supply 340. Meanwhile, according to an embodiment, when the DC-DC converter 100 is switched to a sleep mode, in order to minimize battery 160 consumption power for some functions among the PCB power supplies 300 may be shutdown. For example, the power of the BMS power supply 330 and the peripheral circuit power supply 340 which consumes relatively high battery power is shut down and only the processor power supply 310 for controlling the DC-DC converter 100 and the communication circuit power supply 320 for maintaining communication with the inverter 20 may be maintained.

Also, the DC-DC converter 100 according to an embodiment may prevent additional power loss by terminating (Off) some functions of the processor 130 operating according to an input of the processor power supply 310. For example, in a sleep mode, at least one or more of functions (ADC sensing function, PWM function, and protection function) other than the communication function with the inverter and the clock count function may be deactivated. Here, the communication function with the inverter is maintained to wake up from the sleep mode through communication with the DC-DC converter 100 and switch to the operating mode in the case when the solar power supply becomes capable of producing power in the future. In addition, the activation state of the clock count function may be maintained in order to temporarily operate in a temporary operating mode to sense the remaining battery power by determining when a predetermined time elapses even when the DC-DC converter 100 is in a sleep mode.

Meanwhile, as described above, since the BMS power supply 330 is turned off during a sleep mode operation, there is no way for the DC-DC converter 100 to know the information on the remaining amount of the battery. Accordingly, the DC-DC converter 100 may temporarily turn on only the BMS power to check the remaining amount value at each predetermined time interval and switch the current mode to a temporary operating mode for a short time.

Figure 6:
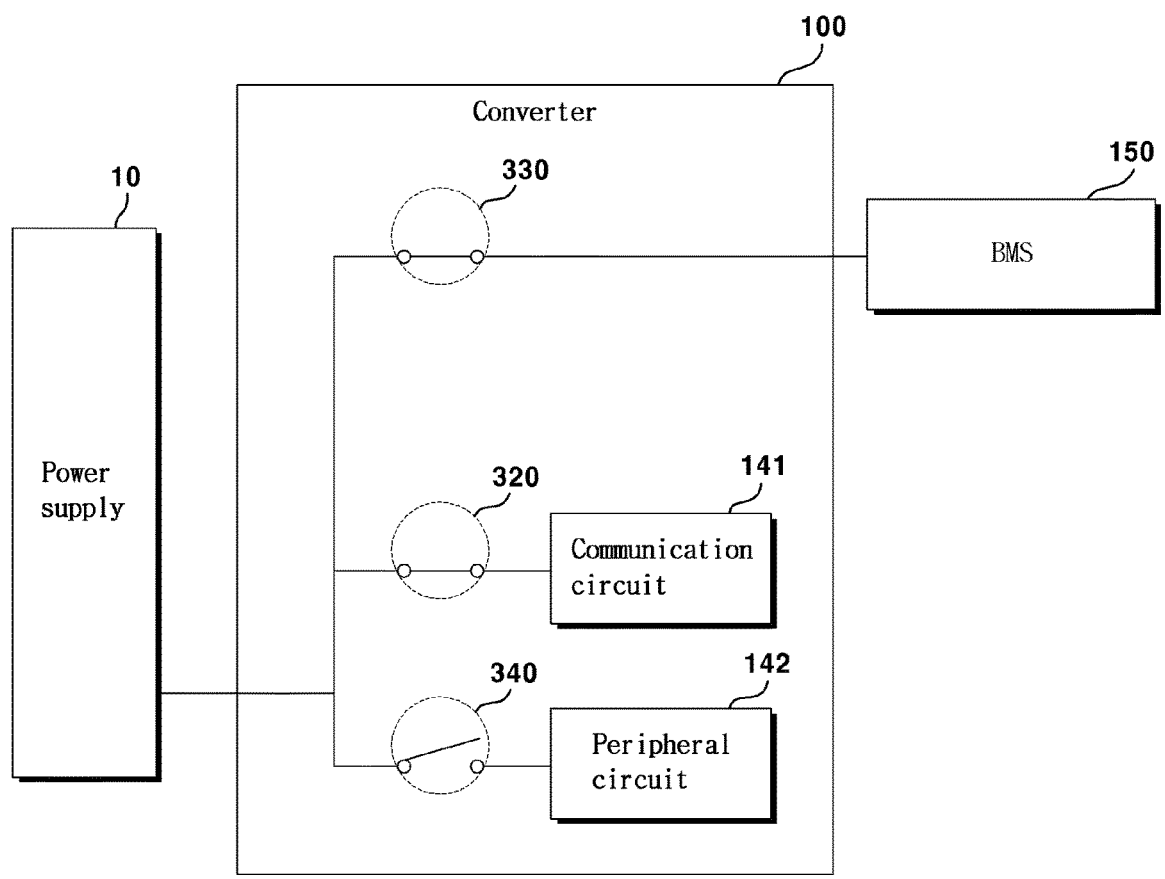
FIG. 6 is a block diagram illustrating a case of switching from a sleep mode to a temporary operating mode for a short period of time according to an embodiment.

FIG. 6 is a block diagram illustrating a case of switching from a sleep mode to a temporary operating mode for a short period of time according to an embodiment.

The DC-DC converter 100 according to an embodiment may switch from a sleep mode to a temporary operating mode for a short time, and temporarily connect the BMS power supply 330 to receive BMS 150 information. At this time, the communication circuit power supply 320 connected to the communication circuit 141 for communicating with the inverter is still maintained in a closed state, and the peripheral circuit power supply 340 connected to the peripheral circuit 142 is still maintaining an open state, thereby possibly minimizing the power consumption. In addition, unlike an operating mode, in a temporary operating mode, at least one of an analog-digital converter (ADC) sensing function, a pulse width modulation (PWM) function, and a protection function is deactivated, thereby possibly minimizing the power consumption.

Figure 7:
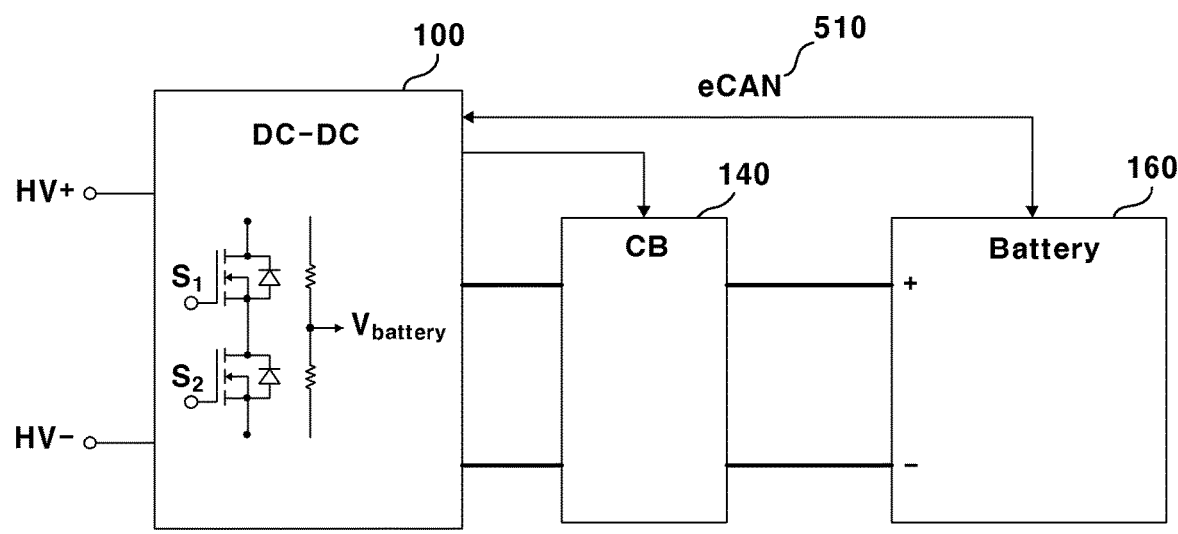
FIG. 7 is a block diagram illustrating a shutdown mode according to an embodiment.

FIG. 7 is a block diagram illustrating a shutdown mode according to an embodiment.

Referring to FIG. 7, the DC-DC converter 100 may check the remaining charge value using the CAN communication 510 of the BMS at a predetermined period. In addition, a circuit breaker 140 capable of physically or electrically cut off power consumption may be disposed between the DC-DC converter 100 and the battery 160. Therefore, the DC-DC converter 100 can prevent over discharging of the battery by operating the circuit breaker based on the remaining charge value of the battery 160, so that the power consumption due to the solar power-linked energy storage system is fundamentally cut-off, thereby possibly preventing the battery from over discharging.

Here, the circuit breaker 140 may be implemented in the form of a circuit breaker (CB) to physically cut off the battery. For example, it may be implemented in the form of a switch, and may be implemented as a two-stage switch to prevent damage to a circuit due to a rapid current change, or as a FET to cut off only power discharged from the battery. The principle in which the circuit breaker 140 is implemented as a two-stage switch will be described in detail later in the description of FIG. 8.

Figure 8:
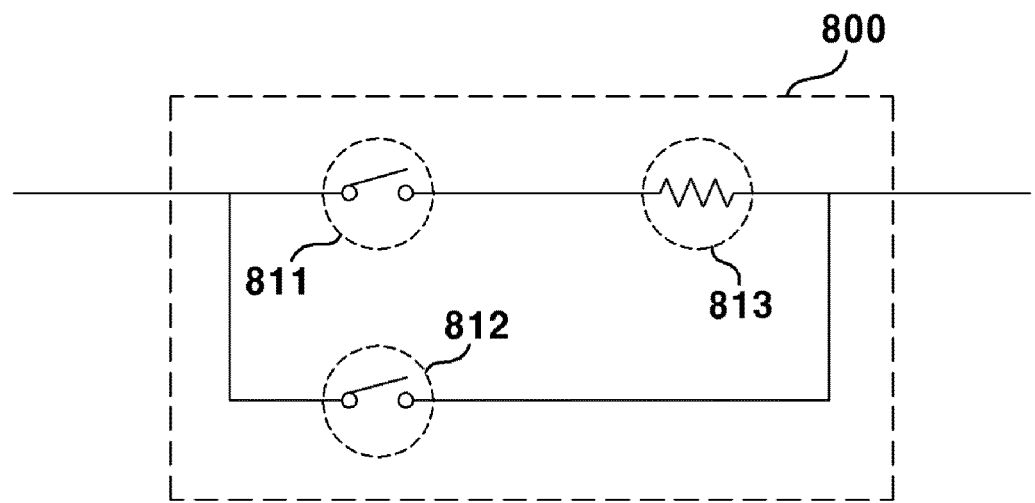
FIG. 8 is a diagram illustrating an example of implementing a switch in a shutdown mode according to an embodiment.

FIG. 8 is a diagram illustrating an example of implementing a switch 800 in a shutdown mode according to an embodiment. The switch 800 may be included in the circuit breaker 140, or the switch 800 may be used to connect the circuit breaker 140 and the battery 160.

Referring to FIG. 8, a switch 800 according to an embodiment may include: a first line including a first switch 811 and a resistor 813 connected in series with the first switch 811; and a second line connected in parallel with the first line and including a second switch 812.

As illustrated in FIG. 8, when the switch 800 is configured in two stages, elements (e.g., the first switch 811 and the second switch 812) inside the switch 800 are not damaged by high current. The first switch 811 and the second switch 812 may each be implemented as a single FET so as not to block a current charged by the battery.

As another example, each of the switches 811 and 812 may be implemented with two FETs to pass current discharged from the battery. When the switches 811 and 812 are implemented with two FETs, the diode directions of each FET may be located in opposite directions.

The operation of the switch 800 may be controlled by the processor 130 according to the embodiment, and the battery may enter a shutdown mode to prevent over discharging. In addition, it may be designed in a way that even in the shutdown mode, when power is inputted from the solar power supply 10 the switch may be automatically closed to proceed to a sleep mode.

Figure 9:
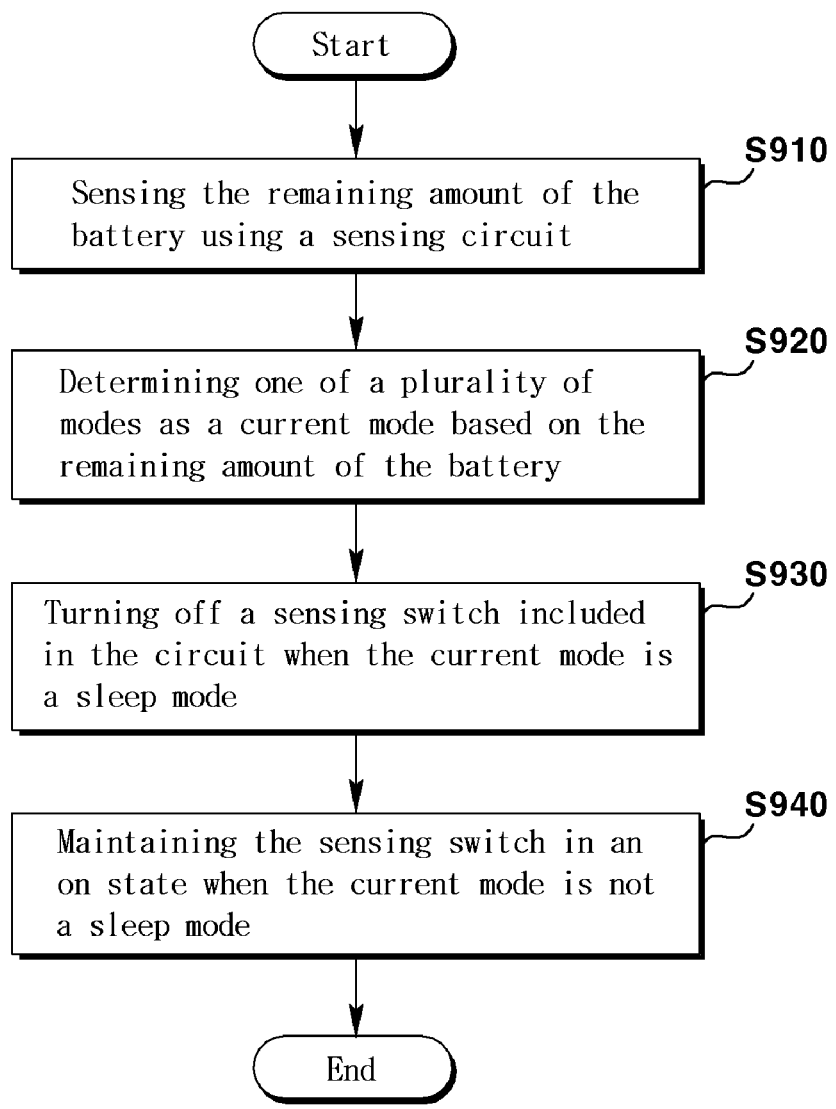
FIG. 9 is a flowchart illustrating a control method of a DC-DC converter according to an embodiment.

FIG. 9 is a flowchart illustrating a control method of a DC-DC converter 100 according to an embodiment.

In step S910, the DC-DC converter 100 according to an embodiment senses the remaining amount of the battery 160 using a sensing circuit 200. In step S920, the DC-DC converter 100 according to an embodiment determines one of a plurality of modes as the current mode based on the remaining amount of the battery 160. For example, the DC-DC converter 100 may determine the current mode as: an operating mode when the remaining amount of the battery 160 is more than a first value; a sleep mode when the remaining amount of the battery 160 is between a first value and a second value; and a shutdown mode when the remaining amount of the battery 160 is less than or equal to a second value.

In step S930, the DC-DC converter 100 according to an embodiment turns off the sensing switch 220 included in the sensing circuit 200 when the current mode is a sleep mode, and in step S940, when the current mode is not a sleep mode, the DC-DC converter 100 according to an embodiment maintains the sensing switch as an on state. Or, when the current mode is a shutdown mode, the DC-DC converter 100 may turn off the sensing switch 220. However, in a shutdown mode, since the battery 160 is electrically or physically separated from the DC-DC converter 100, whether the sensing switch 220 is turned on or not may not affect actual operation.

Meanwhile, the above-described method can be written as a program that can be executed on a computer, and can be implemented in a general-purpose digital computer that operates the program using a computer-readable recording medium. In addition, the structure of the data used in the above-described method can be recorded on a computer-readable recording medium through various means. The computer-readable recording medium includes storage media such as magnetic storage media (for example, ROM, RAM, USB, floppy disk, hard disk, and the like), optical reading media (for example, CD-ROM, DVD, and the like).

It will be understood by a person of ordinary skill in the art related to the present embodiment that it may be implemented in a modified form within a scope not departing from the essential characteristics of the above description. Therefore, the disclosed methods should be considered from an explanatory point of view rather than a limiting point of view. The scope of the present invention is illustrated in the claims rather than the foregoing description, and all differences within the scope equivalent thereto should be construed as being included in the present invention.

The invention claimed is:

1. A DC-DC converter comprising:
   a converting circuit for converting a power received from the solar power supply;
   a sensing circuit including one or more resistors and a sensing switch, and sensing a state of a battery; and
   a processor for controlling the sensing switch based on the state of the battery,
   wherein the processor determines one of a plurality of modes as a current mode based on the state of the battery, and turns off the sensing switch when the current mode is a sleep mode
   wherein the processor determines the current mode as the sleep mode when a remaining amount of the battery is less than or equal to a first value,
   wherein the processor determines the current mode as the shutdown mode when the remaining amount of the battery is less than or equal to a second value, and
   wherein the second value is smaller than the first value.

2. The DC-DC converter according to claim 1, wherein the sensing circuit senses a remaining amount of the battery connected in parallel to the sensing circuit.

3. The DC-DC converter according to claim 1, further comprising:
   an input unit for receiving power;
   an output unit for converting power of the input unit and supplying it to the battery; and
   a circuit breaker for separating electrically the output unit from the battery when the current mode is a shutdown mode.

4. The DC-DC converter according to claim 1, wherein the plurality of modes includes at least one of an operating mode, a standby mode, a fault mode, a shutdown mode, and a sleep mode.

5. The DC-DC converter according to claim 4, wherein the processor turns on the sensing switch when the current mode is the operating mode, the standby mode, or the fault mode.

6. The DC-DC converter according to claim 4, wherein the processor determines the current mode as the fault mode when an abnormality is sensed in the battery.

7. The DC-DC converter according to claim 1, wherein the sleep mode reduces power consumption by deactivating functions other than a function required for communication with an inverter among a plurality of functions.

8. The DC-DC converter according to claim 7, wherein the processor supplies a power to the battery by switching the current mode to an operating mode when the current state is a state in which the battery can be charged through communication with the inverter while operating in the sleep mode or a shutdown mode.

9. The DC-DC converter according to claim 8, wherein the processor determines the current state as a state in which the battery can be charged when a predetermined amount of power or more is supplied from the solar power supply.

10. The DC-DC converter according to claim 1, wherein the processor converts a voltage of the power received from the solar power supply by controlling a plurality of switches included in the converting circuit.

11. A DC-DC converter control method comprising:
    sensing a remaining amount of a battery by using a sensing circuit;
    determining one of a plurality of modes as a current mode based on the remaining amount of the battery;
    turning off a sensing switch included in the circuit when the current mode is a sleep mode; and
    maintaining the sensing switch in an on state when the current mode is not a sleep mode,
    wherein the current mode is determined as the sleep mode when a remaining amount of the battery is less than or equal to a first value,
    wherein the current mode is determined as the shutdown mode when the remaining amount of the battery is less than or equal to a second value, and
    wherein the second value is smaller than the first value.

12. The DC-DC converter control method according to claim 11, wherein the sensing circuit senses a remaining amount of the battery connected in parallel to the sensing circuit.

13. The DC-DC converter control method according to claim 11, wherein the plurality of modes includes at least one of an operating mode, a standby mode, a fault mode, a shutdown mode, and a sleep mode.

14. The DC-DC converter control method according to claim 13, wherein the sensing switch is turned on when the current mode is the operating mode, the standby mode, or the fault mode.

15. The DC-DC converter control method according to claim 12, wherein the current mode is determined as the fault mode when an abnormality is sensed in the battery.

16. The DC-DC converter control method according to claim 11, wherein the sleep mode reduces power consumption by deactivating functions other than a function required for communication with an inverter among a plurality of functions.

* * * * *